C. T. JOSLIN.
CABINET FOR CIGARETTES.
APPLICATION FILED JUNE 3, 1920.
1,354,307.
Patented Sept. 28, 1920.
3 SHEETS—SHEET 1.
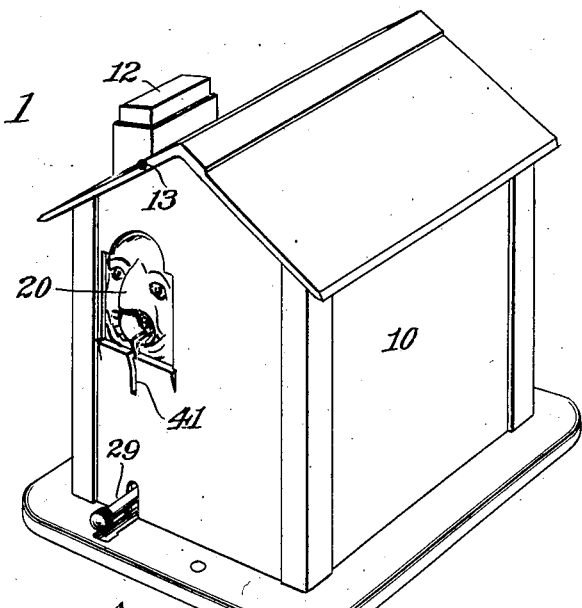
Fig. 1
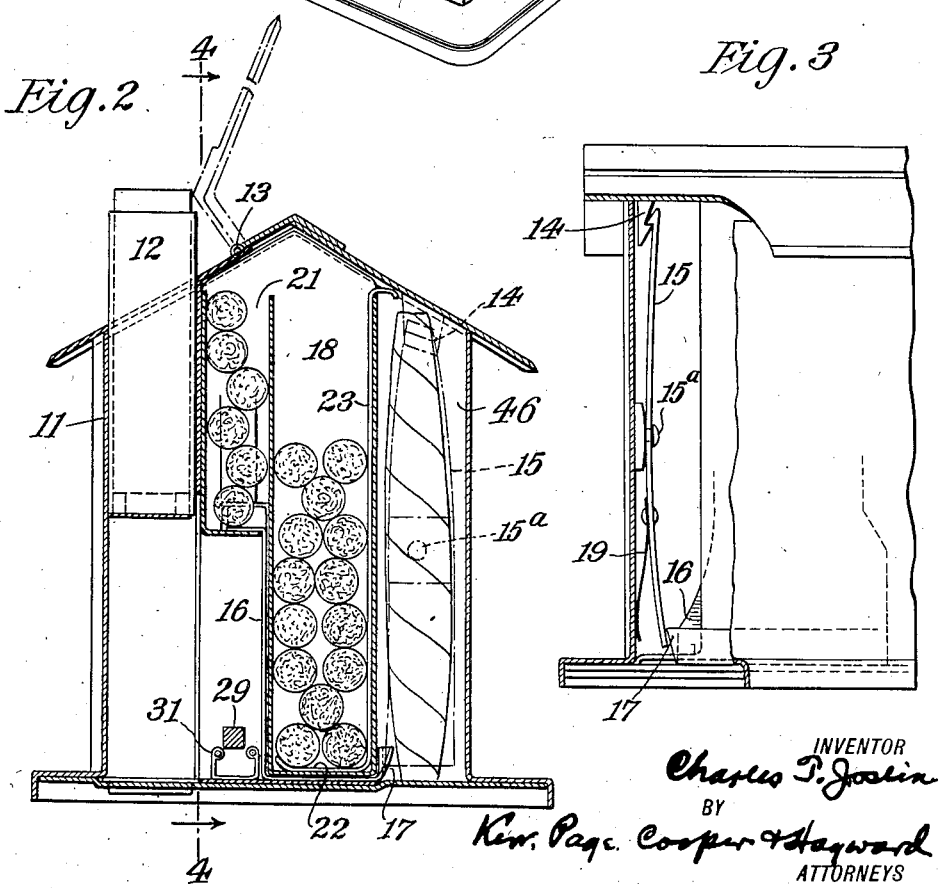
Fig. 2
Fig. 3
INVENTOR
Charles T. Joslin
BY
Kerr, Page, Cooper & Hayward
ATTORNEYS C. T. JOSLIN.
CABINET FOR CIGARETTES.
APPLICATION FILED JUNE 3, 1920.
1,354,307.
Patented Sept. 28, 1920.
3 SHEETS—SHEET 2.
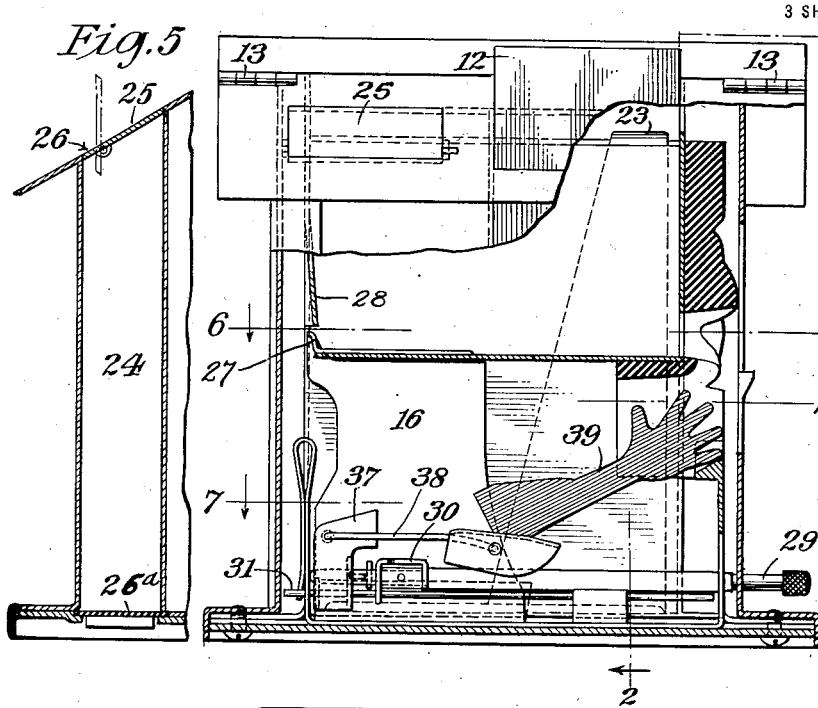
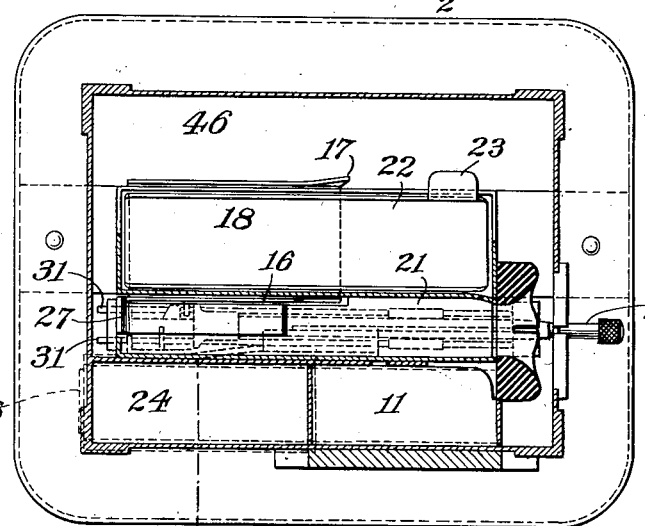
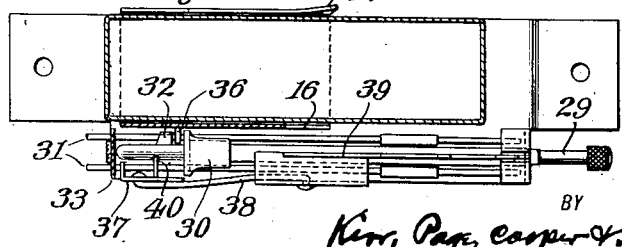
INVENTOR
Charles T. Joslin
BY
Kerr, Page, Cooper & Hayward
ATTORNEYS

C. T. JOSLIN.
CABINET FOR CIGARETTES.
APPLICATION FILED JUNE 3, 1920.

1,354,307.

Patented Sept. 28, 1920.
3 SHEETS—SHEET 3.

INVENTOR
Charles T. Joslin
BY
Kerr, Page, Cooper & Hayward
ATTORNEYS

UNITED STATES PATENT OFFICE.

CHARLES T. JOSLIN, OF FEURA BUSH, NEW YORK.

CABINET FOR CIGARETTES.

1,354,307.   Specification of Letters Patent.   Patented Sept. 28, 1920.

Application filed June 3, 1920. Serial No. 386,197.

*To all whom it may concern:*

Be it known that I, CHARLES T. JOSLIN, a citizen of the United States of America, residing at Feura Bush, in the county of Albany and State of New York, have invented certain new and useful Improvements in Cabinets for Cigarettes or other Articles, of which the following is a full, clear, and exact description.

This invention relates to cabinets or containers for cigarettes, cigars, candy, chewing gum, and other small articles, of the type in which manual operation of a suitable handle causes a certain number of articles, usually one, to be delivered to the operator. The chief object of the invention is to provide a device which has a secret mode of operation, so that delivery of the articles will be made only when the device is operated in a particular manner, other methods of operation resulting in an idle stroke of the operating member. Another object is to provide a device in which the idle stroke, that is, the non-delivery stroke, will cause a humorous legend to be displayed, or will cause a part of the human figure or manikin to make an amusing gesture, such as putting the thumb to the nose with the fingers outspread. To these and other ends the invention consists in the novel features and combinations hereinafter described.

From the subjoined description it will be understood that the invention can be embodied in a great variety of forms. Of these I have selected for illustration herein the one that at the present time is considered to exhibit the invention in its most convenient and effective form. This embodiment is shown in the accompanying drawings, in which Figure 1 is a perspective view of the complete cabinet.

Fig. 2 is a cross section on line 2—2 of Fig. 4.

Fig. 3 is a detail side view, partly in section, illustrating the means for locking the cover of the cabinet.

Fig. 4 is a longitudinal section, about on line 4—4 of Fig. 2.

Fig. 5 is a detail cross section about on line 5 of Fig. 6.

Figs. 6 and 7 are sectional plan views about on lines 6—6 and 7—7, respectively, of Fig. 4.

Figure 8:
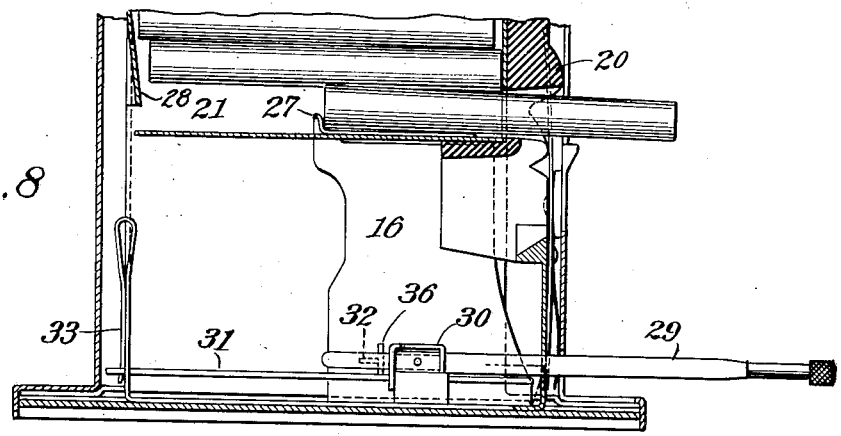

Fig. 8 is a detail longitudinal section illustrating the delivery of a cigarette.

Figure 9:
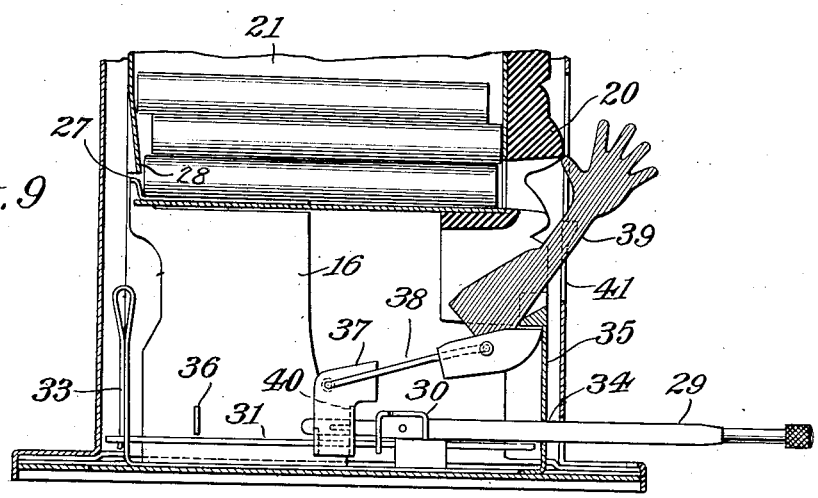

Fig. 9 is a similar view illustrating the idle or "joker" operation, causing the thumb of the manikin to be applied to the nose, with the fingers spread.

Figure 10:
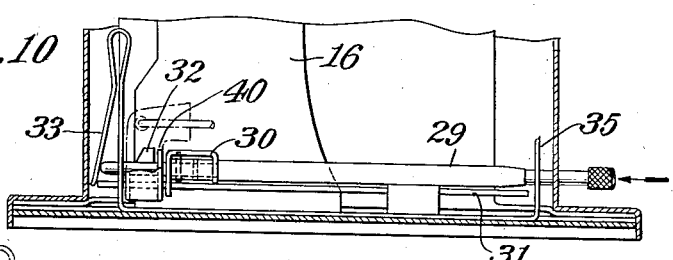

Fig. 10 is a detail view illustrating the shifting of the actuating member to the idle or joker position.

Figures 11, 12:
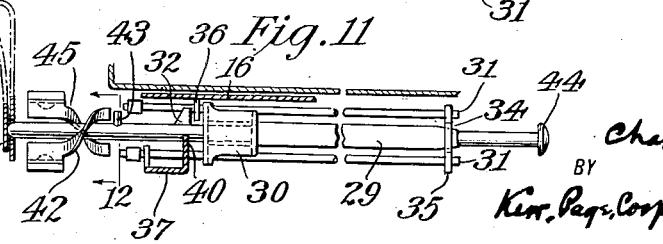

Fig. 11 is a detail plan view of a modification in which the shift from operative to joker position is made automatically when the actuating member is retracted to the limit of its motion.

Fig. 12 is a detail section on line 12—12 of Fig. 11.

The cabinet illustrated is intended for cigarettes, and is in the form of a small house or "cabin" 10, having at one side an open top chimney 11 in which a box of matches, as 12, may be inserted. The roof is hinged, as at 13, to afford access to the interior for filling the cabinet, and is provided on its inner face with a hook 14, Fig. 3, engaged by a spring latch 15 pivoted in the front wall of the cabinet, on the inside, to lock the lid when closed. The delivery member 16, Fig. 2, which is advanced to eject a cigarette, is provided with a finger 17, extending under the storage bin or receptacle 18. When the delivery member is advanced, as explained hereinafter, a cigarette is protruded far enough to be grasped and withdrawn. If the member is advanced still farther, the finger 17 meets the tail of the latch 15, and, compressing spring 19, rocks the latch clockwise out of engagement with hook 14 and thus unlocks the lid. It will be observed that to unlock the lid the delivery member must be actuated, the inoperative or "joker" stroke leaving the lid locked. The latch is attached to the end wall by a pivot 15ᵃ so that it may be swung laterally in either direction to carry its hooked upper end out of the path of the hook 14 when it is desired to leave the lid of the cabinet unlocked, permitting the same to be opened without operating the delivery mechanism.

The cigarettes are ejected through the open mouth of a face 20, Figs. 1 and 8, fixed in a window at the front of the cabinet. Immediately in rear of the window, which is a little to one side of the center, is a narrow, open-topped chute or magazine 21, Figs. 2, 4, 5, 8, 9, in which the cigarettes are placed for delivery. At the side of the chute is the storage receptacle 18, having a movable bottom 22 provided with an arm 23 extending to the top of the receptacle, as in Fig. 2. When the lid is raised the arm 23, which hooks over the edge, can be grasped and raised, thereby lifting the cigarettes and causing them to roll over to the chute 21 to fill the latter, as will be readily understood.

At the rear of the "chimney" 11 is an ash well or pit 24, Figs. 5 and 6, closed at the top by a pivoted lid 25 flush with the roof. By pressing with the finger nail at the point 26 the lid can be swung up, permitting the ashes to be dropped into the receiver. A sliding bottom 26 enables the receiver to be readily emptied.

The delivery member or ejector 16, Figs. 4, 8 and 9, extends up the side wall of the receptacle 18 through a slot in the bottom of the chute 21 and overlies said bottom, and at its rear it is provided with a vertical finger 27 which in the fully retracted position lies under an inclined guide 28 serving to direct the cigarettes to the front of the finger as they descend by gravity in the chute. It will therefore be seen that when the ejector is advanced a cigarette will be pushed out through the mouth of the face 20.

The ejector 16 is actuated by a horizontally sliding rod or stem 29, Figs. 1, 2, 7 and 8, carrying a guide yoke 30 (in which the rod can be rotated) sliding on two guide rods or rails 31. In rear of the yoke the rod 29 has a lug 32. The ends of the rod 29 are round or cylindrical, as shown in Fig. 8, for example, but its intermediate portion is square. Normally the inner end of the rod, when retracted, rests against a spring 33, as in Fig. 7, in which position the angular or square portion of the rod extends out through the square aperture 34 in the vertical guide 35, and the rod cannot be rotated, but the spring permits the rod to be pushed in until the square portion is behind the guide 35, whereupon the rod can be rotated in either direction. When turned clockwise (as seen in Fig. 1) the lug 32 is swung to the rear of a stud 36 on the ejector 16, so that said stud is engaged between the lug 32 and the guide yoke 30. Then if the rod is pulled out the ejector will be advanced and a cigarette will be ejected to the position shown in Fig. 8, in which position it can be grasped and withdrawn. When the rod is pushed in again the ejector will be retracted to the position shown in Fig. 9, and another cigarette will drop in front of finger 27, ready for the next operation.

On one of the rails 31, Figs. 4 and 9, is a sliding traveler 37 to which is pivoted a link 38 carrying at its forward end a "joker," as for example a piece of sheet metal 39 cut in the form of a human forearm with the thumb and fingers of the hand spread apart and resting in a vertical slot at the top of the guide 35. When the actuating rod 29 is turned counterclockwise from the position in which the ejector stud 36 is engaged between lug 32 and yoke 30, lug 32 is swung to the rear of a stud 40 on the traveler 37, thus engaging the stud between lug 32 and yoke 30. Then if the rod 29 is pulled out, the traveler 37 will be advanced and the arm 39 will be slid out of the slot 41, Fig. 9, and as it advances the vertical slot in the top of the guide 35 will swing it up, bringing the thumb to the nose 20, as in Fig. 9. This action will be performed as often as the actuating member 29 is advanced until it is turned back to disengage the stud 40 and reengage stud 36. When the actuating member is turned until the stud 32 is midway between lugs 36 and 40 the member is in "neutral," and when then drawn out, nothing happens.

In practice I prefer to make the face 20 comical in character, representing an individual of African ancestry, and may make the cabinet in simulation of a log cabin. The owner of the device, knowing the secret of its operation, extracts a cigarette at will pushes in the rod and gives it a quick turn before inviting his friend to have a smoke. The friend innocently draws out the rod, and is greeted by "Uncle Tom" with a gesture recognized as one expressing derision. Pressing the rod back for another try, he feels the resistance of the stiff spring 33, and stops for fear of injuring the device. At the same time he is unable to turn the rod in either direction, and is thus baffled until the method of operation is explained to him.

In the construction described above, the turning of the actuating member 29 to the inoperative or "joker" position requires a conscious act by the operator, and hence the secret may be detected by carefully watching the owner operating the device. This is made more difficult by the modification shown in Figs. 11 and 12, in which the shifting of the rod from operative to the joker position is effected automatically. For this purpose a helical guide 42 is provided at the rear of the rod 29, and on the latter is a lateral pin 43. The forward end of the guide lies below the plane of the pin, so that when the rod is pushed in to the limit of its movement from the position shown in Fig. 11 the pin will ride up on the guide and will be revolved to the position in which lug 32 is behind lug 40. The knob 44 on rod 29 is preferably swiveled, so that the owner, having extracted a cigarette, can by merely pressing on the knob cause the rod to turn to the joker position without a twisting motion of his fingers which might betray the secret. When the knob is released, the spring 33 advances the rod, but with stud 32 behind lug 40, as will be readily understood. If in this position the rod is pushed in and turned counterclockwise the pin 43 will engage the other helical guide, 45, but if there released, permitting spring 33 to advance the rod, the guide 45 will turn the rod clockwise to the previous position. From this position, to put the rod again in the position shown in Fig. 11, the rod is pushed in slightly, then turned clockwise by grasping it behind the knob. So long as it is manipulated by the swiveled knob alone, it will always be brought to the position in which the lug 40 is engaged.

In the cabinet illustrated a space 46 is left alongside of the magazine 18, in which articles may be kept, for example, cigars, as indicated in Fig. 2.

The mouth or other opening through which the cigarettes are delivered is preferably roughened inside or lined with suitable friction material to prevent premature or unintentional delivery by gravity or otherwise.

It is to be understood that the invention is not limited to the construction herein specifically illustrated and described, but can be embodied in other forms without departure from its spirit.

I claim as my invention:

1. In a device of the kind described, a magazine, an ejector for ejecting articles therefrom, a manual member to actuate said ejector and adapted to be shifted manually into and out of operative connection therewith.

2. In a device of the kind described, a magazine, an ejector for ejecting articles therefrom, a manually reciprocatable member to actuate the ejector, adapted to be rotated into and out of operative connection therewith.

3. In a device of the kind described, a magazine in the cabinet, an ejector for ejecting articles from the magazine, a normally concealed device movable into and out of view, and a manual member for actuating the ejector or the normally concealed device at will.

4. In a device of the kind described, a magazine, an ejector for ejecting articles from the magazine, a normally concealed device movable into and out of view, and a manually reciprocatable actuating member adapted to be rotated manually into operative connection with said ejector or said normally concealed device to actuate either at will.

5. In a device of the kind described, a magazine, an ejecting device for ejecting articles from the magazine, a normally concealed device movable into and out of view, a manually reciprocatable actuating member rotatable manually into operative connection with the ejecting device or with said normally concealed device to actuate either, and means releasably engaging the actuating member to hold the same in operative connection with either device at will.

6. In a device of the kind described, a magazine, an ejecting device for ejecting articles from the magazine, a normally concealed device movable into and out of view, and a manual actuating member shiftable into and out of operative connection with either of said devices at will.

7. In a device of the kind described, a magazine, an ejecting device for ejecting articles from the magazine, a normally concealed device movable into and out of view, a manual actuating member shiftable into and out of operative connection with either of said devices at will, means releasably engaging said member to hold the same against such shifting movement, and a yielding element for holding said member in engagement with said means.

8. In a device of the kind described, a magazine, an ejecting device for ejecting articles from the magazine, a lid to prevent access to the magazine, a concealed latch releasably engaging the lid to lock the same, and a manual member adapted both to actuate the ejecting device to eject an article and to actuate the latch to release the lid.

9. In a device of the kind described, a magazine, an ejecting device for ejecting articles from the magazine, a normally concealed device movable into and out of view, and a manual actuating member movable between said devices and rotatable into and out of operative connection with either of said devices at will.

10. In a device of the kind described, a magazine, a slidable ejecting device for ejecting articles from the magazine, a normally concealed device slidable into and out of view, and a manually slidable actuating member between said devices and rotatable into and out of operative connection with either device at will.

11. In a device of the kind described, a manual horizontally slidable actuating member, a magazine above the same, an ejecting device arranged at one side of the actuating member and extending into the magazine to eject articles therefrom, a normally concealed member movable into and out of view, an actuating device for the latter member, arranged on the other side of the manual member to actuate the normally concealed member, and means carried by the manual member to engage either of said devices at will to actuate the same when said manual member is rotated.

12. In a device of the kind described, a magazine, an ejecting device to eject articles from the magazine, a casing having an opening, a device normally concealed in said casing but movable into and out of view through said opening, and a manual actuating member adapted to actuate either the ejecting device or the normally concealed device at will.

13. In a device of the kind described, a magazine, a slidable ejecting device therefor, having an actuating lug; a normally concealed device slidable into and out of view, and having an actuating lug; a rotatable and slidable actuating member having a lug adapted to be shifted by rotation of said member into engagement with either of the first mentioned lugs at will to advance the associated device; and means actuated by said member to retract said devices.

14. In a device of the kind described, a slidable ejecting device, a normally concealed device slidable into and out of view, a non-rotatable traveler slidable between said devices to retract the same, and a manual actuating member slidable between said devices and connected with said traveler to actuate the same, and rotatable into and out of operative connection with either of said devices at will to advance the same.

15. In a device of the kind described, a magazine, an ejecting device for ejecting articles from the magazine, a casing having an opening below the magazine, a device normally concealed within the casing but movable into and out of view through said opening, a manual actuating member rotatable into and out of operative connection with either of said devices at will, means normally engaging said actuating member to prevent rotation thereof, said actuating member being shiftable out of engagement with said means.

16. In a device of the kind described, a magazine, an ejecting device to eject articles from the magazine, a normally concealed device movable into and out of view, an actuating member of angular cross section rotatable into and out of operative connection with either of said devices at will, and an angular guide for the actuating member to normally prevent rotation thereof, said member being shiftable out of engagement with said guide to permit rotation.

17. In a device of the kind described, a magazine, a storage receptacle alongside of the magazine, and a lifter in the storage receptacle, by which articles therein can be raised and permitted to pour over into the magazine.

18. In a device of the kind described, a magazine, a storage receptacle alongside of the same, and a movable bottom for the receptacle, having lifting means whereby articles in the receptacle can be raised and permitted to pour over into the magazine.

In testimony whereof I hereto affix my signature.

CHARLES T. JOSLIN.